(12) United States Patent
Yagi

(10) Patent No.: US 6,661,189 B2
(45) Date of Patent: Dec. 9, 2003

(54) METHOD AND APPARATUS FOR CONTROLLING ELECTROMAGNETIC PARTS FEEDER

(75) Inventor: Susumu Yagi, Toyama-ken (JP)

(73) Assignee: YKK Corporation, Tokyo (JP)

( * ) Notice: Subject to any disclaimer, the term of this patent is extended or adjusted under 35 U.S.C. 154(b) by 2 days.

(21) Appl. No.: 09/982,970

(22) Filed: Oct. 22, 2001

(65) Prior Publication Data

US 2002/0105772 A1 Aug. 8, 2002

(30) Foreign Application Priority Data

Oct. 23, 2000 (JP) ........................... 2000-322859

(51) Int. Cl.[7] .................. H02K 33/02; H02P 7/06
(52) U.S. Cl. .................. 318/114; 318/127; 318/128
(58) Field of Search .................. 318/114, 127, 318/128, 129, 130, 807

(56) References Cited

U.S. PATENT DOCUMENTS

| | | | |
|---|---|---|---|
| 3,864,618 A | 2/1975 | Hammond | 363/131 |
| 4,331,263 A | 5/1982 | Brown | 222/63 |
| 5,372,237 A | 12/1994 | Yagi | 198/444 |
| 5,472,079 A | 12/1995 | Yagi et al. | 198/762 |
| 5,910,698 A | 6/1999 | Yagi | 310/316.03 |
| 6,133,701 A | * 10/2000 | Göktürk et al. | 318/114 |

FOREIGN PATENT DOCUMENTS

GB    2 109 169    5/1983

OTHER PUBLICATIONS

European Search Report Application No. EP 10308514 dated Feb. 1, 2002.

* cited by examiner

*Primary Examiner*—Nestor Ramirez
*Assistant Examiner*—Judson H. Jones
(74) *Attorney, Agent, or Firm*—Finnegan, Henderson, Farabow, Garrett & Dunner, L.L.P.

(57) ABSTRACT

An apparatus for controlling an electromagnetic parts feeder comprises a vibrating unit provided with an electromagnet that vibrates at a predetermined frequency, a bowl adapted to discharge parts accommodated therein by means of the vibrating unit, a driving circuit for driving the electromagnet, and a control unit for outputting a driving signal to the driving circuit to cause a predetermined driving. The control is performed by idling the driving of the electromagnet temporarily at every predetermined driving cycles thereof and controlling the vibration of the electromagnet based on a signal obtained from a coil of the electromagnet by its electromagnetic induction during the idling period, for instance, based on a phase difference between a waveform of this signal and the driving signal of the driving circuit.

10 Claims, 5 Drawing Sheets

METHOD AND APPARATUS FOR CONTROLLING ELECTROMAGNETIC PARTS FEEDER

BACKGROUND OF THE INVENTION

1. Field of the Invention

This invention relates to a method of and an apparatus for controlling an electromagnetic parts feeder which feeds various types of parts by vibration of a bowl caused by an alternating magnetic field generated by an electromagnet.

2. Description of the Prior Art

A typical example of the conventional electromagnetic parts feeders comprises, as shown in FIG. 1, a bowl 2 adapted to accommodate therein a large number of parts for supply and discharge the parts while exerting vibration to the bowl, a vibrating unit 4 provided with an electromagnet or piezoelectric element for driving the bowl 2 at a predetermined resonance frequency, and a driving control system 5 for driving the vibrating unit 4. This parts feeder is adapted to electrically detect a vibration amplitude of the bowl 2 by an amplitude sensors 6 such as, for example, a photoelectric transducer and a piezoelectric element, feed it back to the driving control system 5, and control the electric current or voltage for driving the bowl 2 to drive the bowl at a constant amplitude at any time.

Since this method requires the amplitude sensor 6 to detect the vibration of the bowl 2, the construction of the system becomes complicated, the number of components for detecting the vibration increases, and also the cost becomes high.

SUMMARY OF THE INVENTION

An object of the present invention is, therefore, to provide a method of and an apparatus for controlling an electromagnetic parts feeder with simple construction and enabling accurate vibration.

In accordance with one aspect of the present invention, there is provided a method of controlling an electromagnetic parts feeder which comprises a vibrating unit provided with an electromagnet of which magnetic field vibrates at a predetermined frequency, a bowl adapted to discharge parts accommodated therein by means of the vibrating unit, a driving circuit for driving the electromagnet, and a control unit for outputting a driving signal to the driving circuit to cause a predetermined driving. The method comprises idling the driving of the electromagnet temporarily at every predetermined driving cycles of the electromagnet and controlling vibration of the electromagnet based on a signal such as a voltage or electric current obtained from the electromagnet mentioned above by its electromagnetic induction during the idling period, for instance, based on a phase difference between a waveform of this signal and the driving signal of the driving circuit mentioned above.

In a preferred embodiment, a resonance frequency of the electromagnetic parts feeder is previously measured before it is controlled. When the measurement of the resonance frequency is made, the electromagnet is driven by the driving circuit mentioned above, the driving by the driving circuit is temporarily idled at every predetermined driving cycles, and the electromotive force obtained from the electromagnet by its electromagnetic induction is measured during the idling period. The frequency at which the signal becomes maximum is assumed as a resonance frequency. Then, the electromagnet is driven by the driving circuit at the obtained resonance frequency, and the driving by the driving circuit is temporarily idled at every predetermined driving cycles. During the idling period, a signal obtained from the electromagnet by its electromagnetic induction, a phase difference between a waveform of this signal and the driving signal of the driving circuit mentioned above, and the resonance frequency mentioned above are stored in a storage element. When the vibrating unit is driven, it is driven at the resonance frequency stored. Furthermore, the control of the electromagnet is carried out in such a way that the phase difference between the waveform of the signal obtained by the electromagnetic induction and the driving signal of the driving circuit becomes equal to the stored phase difference mentioned above.

In accordance with a second aspect of the present invention, there is provided a system for controlling an electromagnetic parts feeder. This system comprises a vibrating unit provided with an electromagnet that vibrates at a predetermined frequency, a bowl adapted to discharge parts accommodated therein by means of the vibrating unit, a driving circuit for driving the electromagnet, a control unit for outputting a driving signal to the driving circuit to cause a predetermined driving and temporarily idling the driving of the electromagnet at every predetermined driving cycles of the electromagnet, a signal detecting means for detecting a waveform of a signal obtained from the electromagnet by its electromagnetic induction during the idling period, a phase difference detecting means disposed in the control unit for detecting a phase difference between the waveform of the signal obtained by the signal detecting means and the driving signal waveform of the driving circuit, and a vibration controlling means for controlling vibration of the electromagnet based on the phase difference obtained by the phase difference detecting means.

In this specification, the signal mentioned above indicates a voltage or an electric current. When the signal indicates a voltage, the terms including the word "signal" such as, for example, a signal waveform, a driving signal, a signal detecting means, and a driving signal waveform refer to a voltage waveform, a driving voltage, a voltage detecting means, and a driving voltage waveform, respectively. When the signal is an electric current, they refer to, for example, a current waveform, a driving current, a current detecting means, and a driving current waveform.

The method of and the apparatus for controlling the electromagnetic parts feeder as constructed above are capable of accurately detecting the vibration by utilizing a coil of the electromagnet as a sensor, without using a special amplitude sensor that detects the amplitude of the vibrating unit, so that the construction thereof can be remarkably simplified. Moreover, since the resonance frequency of the parts feeder is once measured and stored and the parts feeder is operated based on the stored resonance frequency and other signals or the data of phase difference, it is possible to drive the parts feeders on their respective optimal driving conditions. Since the resonance frequency can be measured again even when the construction of the parts feeder is changed, it is possible to drive the parts feeder always at suitable conditions.

BRIEF DESCRIPTION OF THE DRAWINGS

Other objects, features, and advantages of the invention will become apparent from the following description taken together with the drawings, in which.

DETAILED DESCRIPTION OF THE PREFERRED EMBODIMENTS

Figure 1:
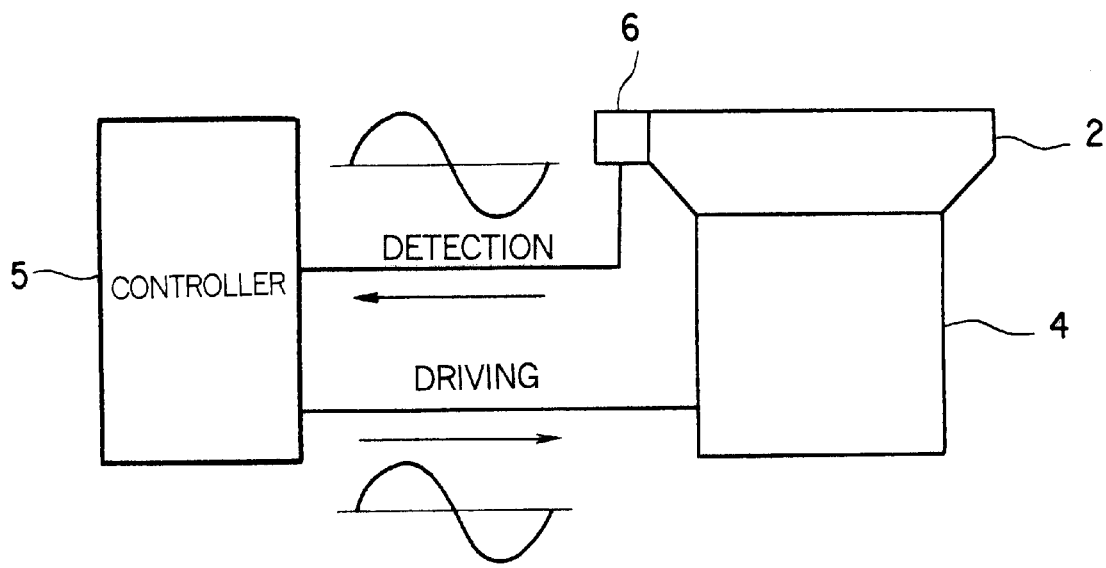
FIG. 1 is a schematic view showing a conventional method of controlling a parts feeder.
Figure 2:
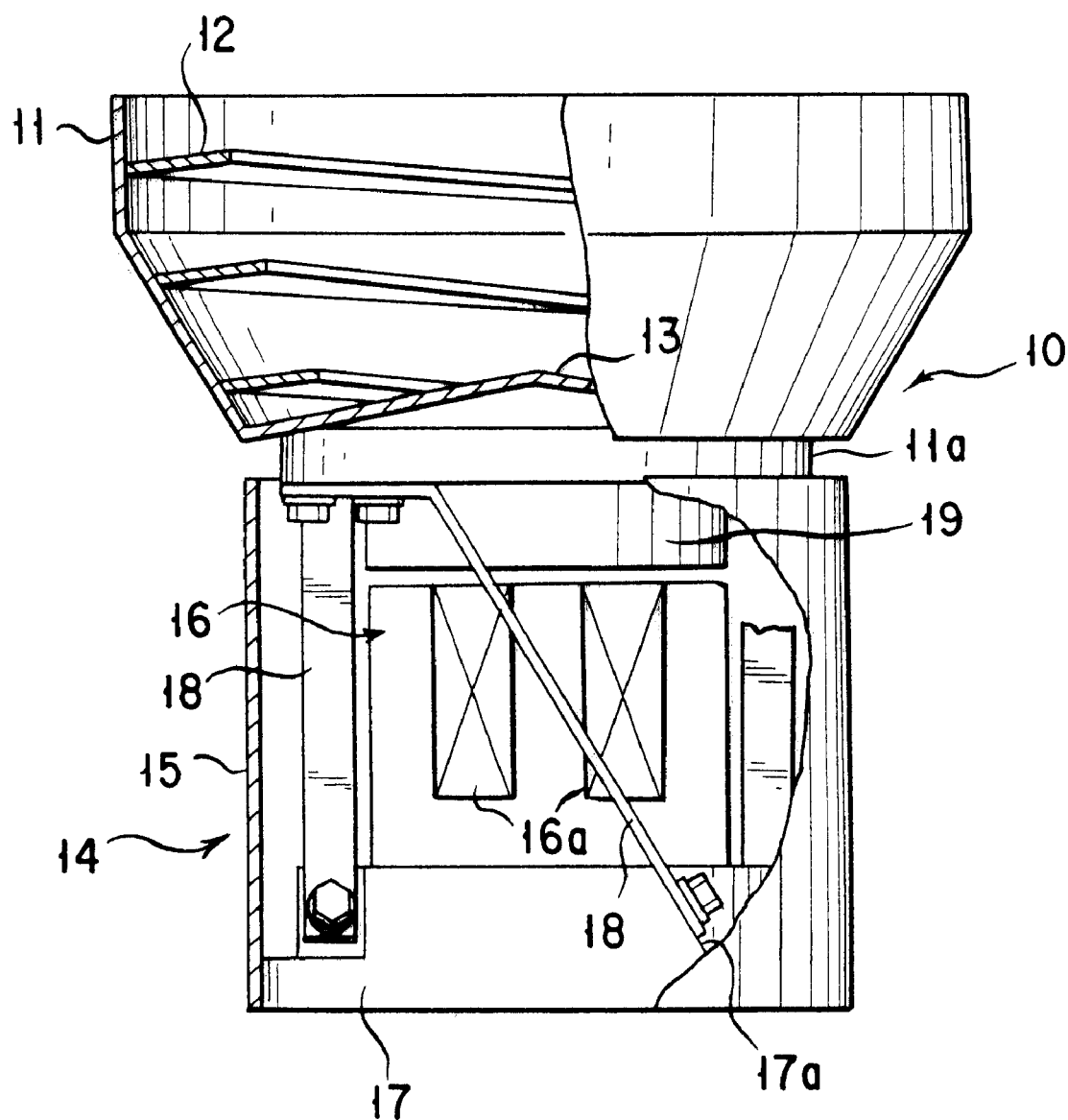
FIG. 2 is a partially cutaway side elevational view schematically illustrating a conventional electromagnetic parts feeder to which a control system according to the present invention is applicable.

Referring to the drawings, FIG. 2 illustrates an example of a conventional electromagnetic parts feeder to which a control system according to the present invention is applicable. Briefly stated, the parts feeder 10 comprises a bowl 11 adapted to accommodate therein a large number of parts and discharge the parts in turn while they are being vibrated by the vibration of the bowl and a vibrating unit 14 for vibrating the bowl 11. The bowl 11 is provided with a side wall having a spiral parts feed track 12 formed on the inner peripheral surface thereof in the form of the gently upwardly sloping surface and a conical bottom plate 13 formed in the shape of a gently sloping surface. The arrangement is made such that parts (not shown) accommodated in the bowl 11 may drop along the conical sloping surface of the bottom plate 13 and collect in the lower end of the feed track 12. The vibrating unit 14 is composed of an electromagnet 16 mounted on a base 17 fixed to the bottom of a housing 15. The numeral 16a indicates a coil of the electromagnet. A lower disc part 11a of the bowl 11 is connected with the base 17 by means of circumferentially inclined plate springs 18 disposed around the electromagnet 16 at a plurality of places (four places in the embodiment shown in FIG. 2). Stating in brief, a bent upper end portion of each of the plate springs 18 is fixedly secured to the disc part 11a by means of screws, whilst the lower end portion thereof is fixedly secured to a slope 17a formed on the base 17 by means of a screw. A movable core 19 of the electromagnet 16 is fixedly secured to the lower surface of the disc part 11a. Accordingly, when the electromagnet 16 installed on the base 17 is rendered on and off, the movable core 19 and the disc part 11a of the bowl 11 fixedly secured thereto are attracted by the electromagnet 16 against the resiliency of the plate springs 18 and moved away from the electromagnet 16 by the resilient force of the latter. However, because the plate springs 18 are inclined relative to the circumferential direction, when the electromagnet 16 is rendered on and off, the disc part 11a and the bowl 11 fixedly secured thereto are subjected to combined vertical motion and reciprocal twisting motion which are repeated periodically, so that the parts in the bowl 11 are subjected to a circumferential delivery force and transferred to the upper part of the feed track 12 while they are allowed to jump up and down. The operation of the parts feeder is described, for example, in U.S. Pat. No. 5,372,237 issued Dec. 13, 1994 to Susumu Yagi, the teachings of which are hereby incorporated by reference.

Figure 3:
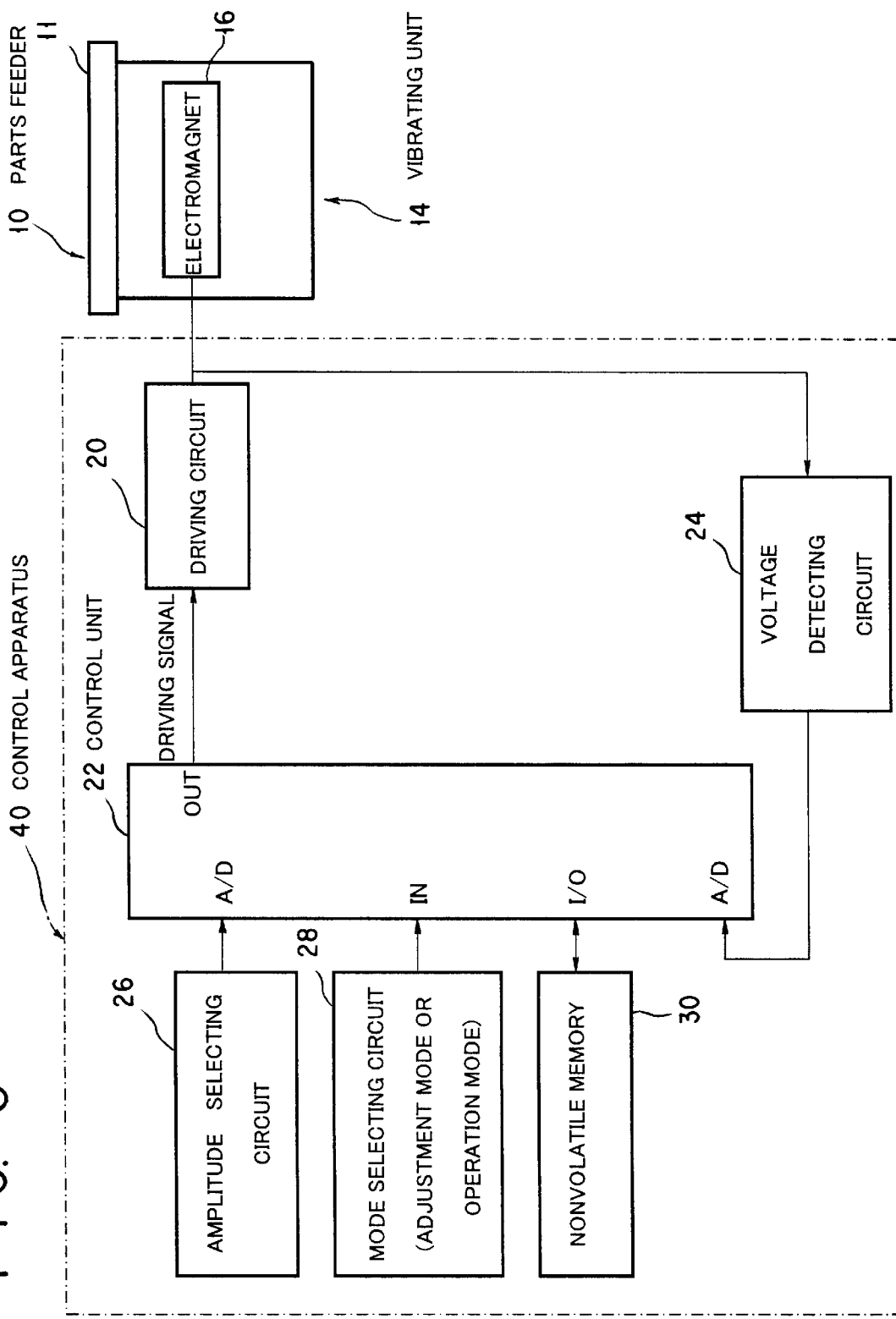
FIG. 3 is a schematic block diagram of a control system of an electromagnetic parts feeder according to one embodiment of the present invention.

Now, the control apparatus 40 for driving the electromagnet 16 is explained below with reference to FIG. 3. The electromagnet 16 is connected to a driving circuit 20 comprising an electric power amplifier etc., and the driving circuit 20 is connected to a control unit 22 comprising a microcomputer which outputs a driving signal for the electromagnet 16. Further, the electromagnet 16 is connected to a voltage detecting circuit 24 for detecting a voltage generated between both ends of the coil of the electromagnet, and an output terminal of the voltage detecting circuit 24 is connected to an input terminal of an A/D converter of the control unit 22.

To the control unit 22, an amplitude setting circuit 26 for adjusting a vibration amplitude of the vibrating unit 14 caused by the electromagnet 16 is connected through the medium of the driving circuit 20. Besides, a mode setting circuit 28 for shifting the driving mode of the parts feeder 10 from an adjustment mode to an operation mode and vice versa is connected to the control unit 22. Further, the control unit is provided with a storage element 30, such as a nonvolatile memory, for storing data such as a predetermined voltage value, a phase difference, and a frequency and for outputting the data to the control unit 22 and inputting the data therefrom.

Figure 4:
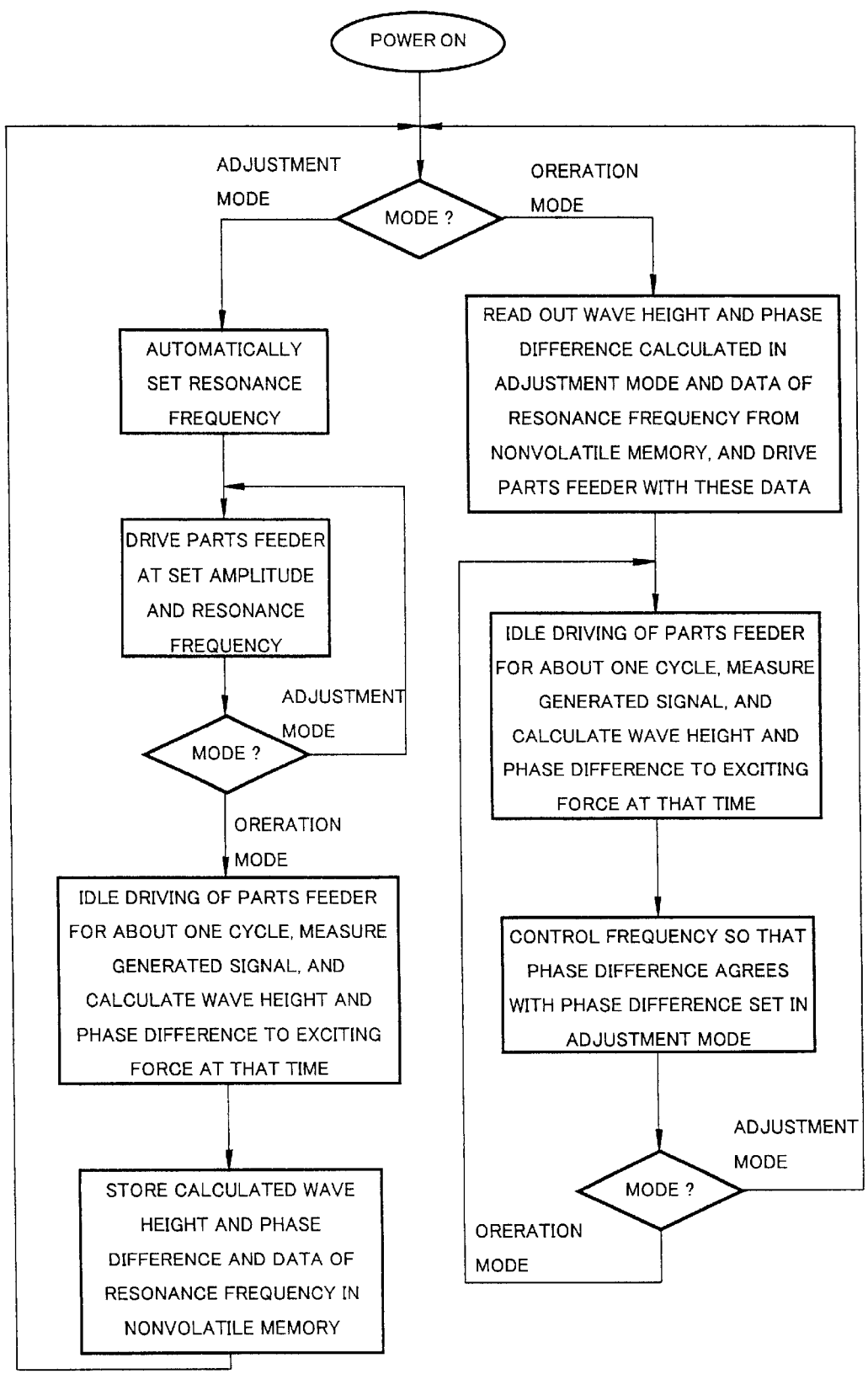
FIG. 4 is a flow chart showing the control sequence of the electromagnetic parts feeder according to the embodiment mentioned above.
Figure 5:
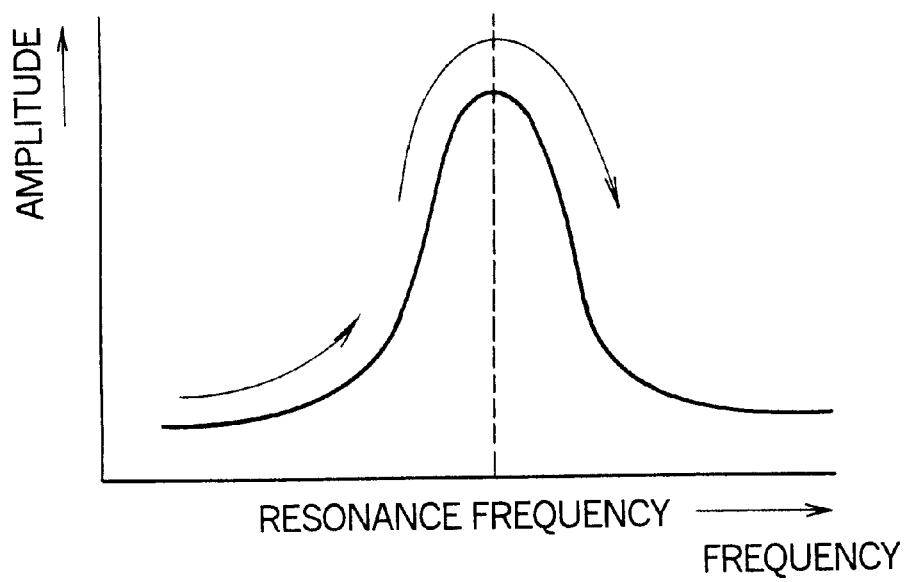
FIG. 5 is graph showing the relation between a vibration frequency and an amplitude of the electromagnetic parts feeder according to the embodiment mentioned above.
Figure 6:
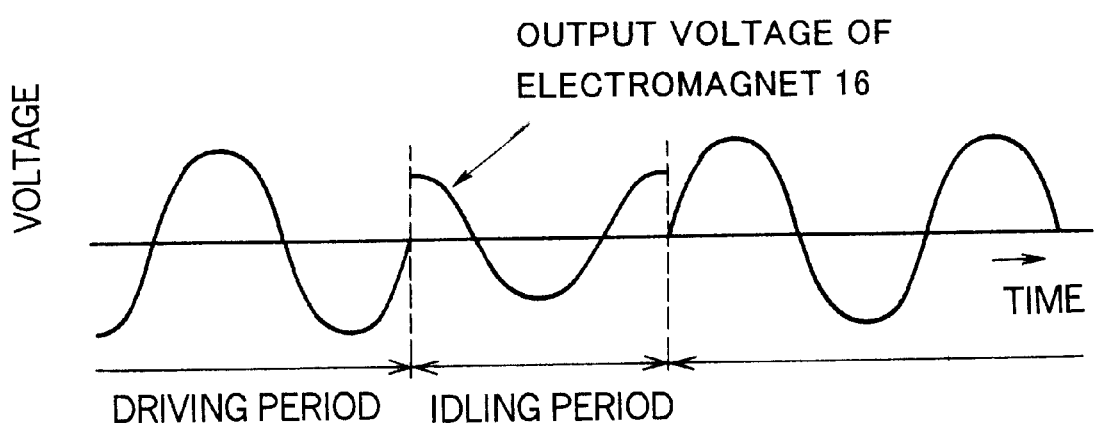
FIG. 6 is graph showing a driving waveform of the electromagnetic parts feeder according to the embodiment mentioned above.

The driving method and the controlling method of the electromagnetic parts feeder 10 of this embodiment are as follows. First, as shown in FIG. 4 through FIG. 6, a power supply is switched on and the driving mode of the electromagnetic parts feeder 10 is selected by the mode setting circuit 28. Usually, a resonance frequency of the electromagnetic parts feeder 10 is measured and stored therein at the time of shipment of the electromagnetic parts feeder 10. Further, since the resonance frequency changes when the natural frequency of the vibration system is changed by exchanging the bowl 12 or other component part thereof for another, the resonance frequency is measured under the adjustment mode and stored therein.

Since an amplitude becomes maximum at the resonance frequency in the vibrating unit 14, as shown in FIG. 5, its frequency is swept without changing a driving voltage, and the frequency at which the amplitude becomes maximum is assumed as the resonance frequency. In the measurement of the resonance frequency, the electromagnet 16 is driven by the driving circuit 20, the driving by the driving circuit 20 is temporarily idled at every predetermined driving cycles, and a voltage produced by the electromagnetic induction in the coil 16a of the electromagnet 16 that still vibrates by inertia during the idling period is measured. The frequency at which the voltage becomes maximum is assumed as the resonance frequency. This operation for measuring the resonance frequency is performed automatically according to a predetermined program. The amplitude of the vibrating unit 14 when driven at the resonance frequency is set by the amplitude setting circuit 26.

Next, the driving mode is switched to the operation mode by the mode setting circuit 28. The electromagnet 16 is driven by the driving circuit 20 with the resonance frequency and amplitude set and, as shown in FIG. 6, the driving by the driving circuit 20 is idled temporarily for a period of one cycle or 1.5 cycles, for example, at every predetermined cycles, for example, 50 cycles. A voltage obtained from the coil 16a of the electromagnet 16 by its electromagnetic induction during the idling period is detected by the voltage detecting circuit 24 and outputted to the control unit 22. In the control unit 22, A/D conversion of the voltage waveform obtained by the voltage detecting circuit 24 is performed and a phase difference between this voltage waveform and a waveform of a driving signal for driving the driving circuit 20 and serving as the exciting force is calculated. Furthermore, the above resonance frequency, the wave height of the voltage waveform at that frequency, and the above-mentioned phase difference are stored in a storage element 30.

Then, in the operation of the electromagnetic parts feeder 10, the mode is set at the operation mode by the mode setting circuit 28. The wave height of the driving voltage and the resonance frequency stored in the storage element 30 during the adjustment mode are read out and the control unit 22 drives the electromagnet 16 with these values through the medium of the driving circuit 20. During this mode, the driving by the driving circuit 20 is idled temporarily for a period of one cycle or 1.5 cycles, for example, at every predetermined cycles, for example, 50 cycles. A voltage is produced between both ends of the coil 16a of the electromagnet 16 by the electromagnetic induction during this idling period, and this voltage is detected by the voltage detecting circuit 24 and outputted to the control unit 22. In the control unit 22, A/D conversion of the voltage waveform obtained by the voltage detecting circuit 24 is performed, and a phase difference between this voltage waveform and a waveform of the driving signal as the exciting force for driving the driving circuit 20 is calculated. And a vibrating frequency of the electromagnet 16 is controlled in such a way that the phase difference between the voltage waveform obtained from the electromagnet 16 and the driving voltage of the driving circuit 20 becomes equal to the above-mentioned phase difference stored during the adjustment mode. This control is continued during operation of the electromagnetic parts feeder 10.

According to the method and apparatus for controlling the electromagnetic parts feeder of this embodiment, the mechanical vibration of the electromagnet 16 is detected by the coil 16a of the electromagnet 16 owing to the temporary pause of driving voltage and converted into an electric signal, and the detected signal is sent to the control unit 22. It is therefore possible to perform the amplitude detection and drive control accurately, without using the special sensor for detecting the amplitude. Further, since the electromagnet 16 itself serves as a sensor, the construction is simple and the detected signal is very accurate. Moreover, there is no problem in the driving of the vibrating unit 14 because it vibrates by inertia even if the driving of the electromagnet 16 is temporarily idled.

Further, since the adjustment mode and the operation mode are interchangeable and in the adjustment mode the parts feeder 10 can be adjusted to the optimal resonance frequency as required. Therefore, the parts feeder can always be driven in an appropriate state.

It should be noted that the present invention is not limited to the embodiments as described above and any modifications thereof may be made. For instance, the operation idling period may be set suitably at any period so long as it does not substantially affect the driving of the parts feeder 10. Furthermore, the aforementioned control can be performed by current detection as well in the same way as the above method employing detection of the voltage obtained by the electromagnetic induction of the electromagnet 16. The present invention is applicable not only to the parts feeder having a bowl but also to any apparatus for supplying parts by using the electromagnet. The described embodiments are therefore to be considered in all respects as illustrative and not restrictive, the scope of the invention being indicated by the appended claims rather than by the foregoing description and all changes which come within the meaning and range of equivalency of the claims are, therefore, intended to be embraced therein.

What is claimed is:

1. A method of controlling an electromagnetic parts feeder which comprises a vibrating unit provided with an electromagnet of which a magnetic field vibrates at a predetermined frequency, a driving circuit for driving said electromagnet, and a control unit for outputting a driving signal to said driving circuit to cause a predetermined driving, comprising the steps of:

idling the driving of said electromagnet temporarily at a predetermined driving cycle of said electromagnet; and controlling vibration of said vibrating unit based on a signal obtained from a coil of said electromagnet by its electromagnetic induction during a period of said idling, wherein said vibration of said electromagnet is controlled based on a phase difference between a waveform of said signal obtained from said electromagnet by its electromagnetic induction during said idling period and the driving signal of said driving circuit.

2. The method set forth in claim 1, wherein said controlling is performed by previously measuring a resonance frequency of said electromagnetic parts feeder, driving said electromagnet at said resonance frequency by said driving circuit, temporarily idling the driving by said driving circuit at said predetermined driving cycle, storing said phase difference between the waveform of said signal obtained from said electromagnet by its electromagnetic induction during said idling period and the driving signal of said driving circuit and said resonance frequency in a storage element and driving said vibrating unit at the stored resonance frequency when it is driven.

3. The method set forth in claim 2, wherein measurement of said resonance frequency of said electromagnetic parts feeder is performed by driving said electromagnet by said driving circuit, idling the driving by said driving circuit temporarily at said predetermined driving cycle, measuring a signal obtained from said electromagnet by its electromagnetic induction during a period of said idling, and assuming a frequency at which said signal becomes maximum as said resonance frequency.

4. The method set forth in claim 2, wherein said vibrating unit is controlled in such a way that said phase difference between the waveform of the signal obtained by said electromagnetic induction and the driving signal of said driving circuit becomes equal to the stored phase difference.

5. The method set forth in claim 1, wherein said idling period is one cycle or 1.5 cycles of said driving cycles.

6. An apparatus for controlling an electromagnetic parts feeder, comprising:

a vibrating unit provided with an electromagnet that vibrates at a predetermined frequency;

a bowl adapted to discharge parts accommodated therein by means of said vibrating unit;

a driving circuit for driving said electromagnet;

a control unit for outputting a driving signal to said driving circuit to cause a predetermined driving and temporarily idling the driving of said electromagnet at every predetermined driving cycles of said electromagnet;

a signal detecting means for detecting a waveform of a signal obtained from a coil of said electromagnet by its electromagnetic induction during a period of said idling;

a phase difference detecting means for detecting a phase difference between the waveform of said signal obtained by said signal detecting means and a waveform of said driving signal of said driving circuit; and a vibration controlling means for controlling vibration of said electromagnet based on the phase difference obtained by said phase difference detecting means.

7. The method set forth in claim 1, wherein said idling occurs at every predetermined driving cycle.

8. The method set forth in claim 7, wherein said every predetermined driving cycle is every 50th cycle.

9. The apparatus set forth in claim 1, wherein said signal detecting means is a voltage detecting circuit.

10. The apparatus set forth in claim 1, wherein said control unit is provided with an amplitude setting circuit for adjusting an amplitude of said vibrating unit through the medium of said driving circuit, a mode setting circuit for shifting the driving mode of said parts feeder from an adjustment mode to an operation mode and vice versa, and a nonvolatile memory for storing data.

* * * * *

UNITED STATES PATENT AND TRADEMARK OFFICE
CERTIFICATE OF CORRECTION

PATENT NO.     : 6,661,189 B2
DATED          : December 9, 2003
INVENTOR(S)    : Susumu Yagi It is certified that error appears in the above-identified patent and that said Letters Patent is hereby corrected as shown below:

Column 6,
Line 29, after "element", insert a comma.

Column 7,
Line 8, "claim 1," should read -- claim 6, --.

Column 8,
Line 1, "claim 1," should read -- claim 6, --.

Signed and Sealed this

Twenty-eighth Day of December, 2004

JON W. DUDAS
*Director of the United States Patent and Trademark Office*